United States Patent
Koss et al.

(10) Patent No.: US 11,560,306 B2
(45) Date of Patent: Jan. 24, 2023

(54) METHOD FOR PRODUCING AMMONIA

(71) Applicant: GASCONTEC GMBH, Bad Homburg v. d. Höhe (DE)

(72) Inventors: Peter Ulrich Koss, Bad Homburg v. d. Höhe (DE); Dierk Müller, Karben (DE); Ulrich Wagner, Bernburg (DE)

(73) Assignee: GASONTEC GMBH, Bad Homburg v.d. Hoehe (DE)

( * ) Notice: Subject to any disclaimer, the term of this patent is extended or adjusted under 35 U.S.C. 154(b) by 228 days.

(21) Appl. No.: 16/499,664

(22) PCT Filed: May 9, 2018

(86) PCT No.: PCT/EP2018/062111
§ 371 (c)(1),
(2) Date: Jan. 23, 2020

(87) PCT Pub. No.: WO2018/206705
PCT Pub. Date: Nov. 15, 2018

(65) Prior Publication Data
US 2020/0216312 A1    Jul. 9, 2020

(30) Foreign Application Priority Data
May 11, 2017   (EP) .................................. 17170711

(51) Int. Cl.
*C01B 3/02* (2006.01)
*C01B 3/38* (2006.01)
(Continued)

(52) U.S. Cl.
CPC .............. *C01B 3/025* (2013.01); *C01B 3/382* (2013.01); *C01B 3/48* (2013.01); *C01C 1/0476* (2013.01);
(Continued)

(58) Field of Classification Search
CPC ........... C01B 3/025; C01B 3/382; C01B 3/48; C01B 2203/0244; C01B 2203/0425; C01B 2203/043; C01B 2203/0475; C01C 1/0476
See application file for complete search history.

(56) References Cited

U.S. PATENT DOCUMENTS

| 4,553,981 A | 11/1985 | Fuderer |
| 2006/0013762 A1* | 1/2006 | Kuipers ................. B01J 8/0492 423/651 |

(Continued)

FOREIGN PATENT DOCUMENTS

| DE | 3308305 A1 | 9/1983 |
| DE | 3308305 A1 | 9/1984 |
| DE | 4334257 A1 | 4/1995 |

OTHER PUBLICATIONS

International Search Report from parent application PCT/EP2018/062111, dated Jun. 20, 2018.
(Continued)

*Primary Examiner* — Jafar F Parsa
(74) *Attorney, Agent, or Firm* — William Gray Mitchell

(57) ABSTRACT

The invention relates to a method for producing ammonia (1), wherein a carbon-containing energy carrier flow (2) and an oxygen flow (3) from an oxygen-producing assembly (4) are fed to a synthesis gas reactor assembly (5) for obtaining a synthesis gas flow (6) with hydrogen and carbon oxides, wherein the synthesis gas flow (6) is fed to an adsorption device (7) for separating the synthesis gas flow (6) into a hydrogen flow (8), which comprises hydrogen, and a purge flow (9), and wherein the hydrogen flow (8) and a nitrogen flow (10) are fed to an ammonia reactor assembly (11) and converted into ammonia (1) there. The method is characterized in that the purge flow (9) is fed to a recovery device (12), which obtains a hydrogen-containing recovery flow
(Continued)

(13) from the purge flow (9) and discharges a waste gas flow (14) therefrom, and that the hydrogen of the recovery flow (13) is at least partly fed to the ammonia reactor assembly (11) for conversion into ammonia (1). The invention also relates to a corresponding system for the production of ammonia (1).

13 Claims, 1 Drawing Sheet

(51) Int. Cl.
    *C01B 3/48*     (2006.01)
    *C01C 1/04*     (2006.01)

(52) U.S. Cl.
    CPC ........... *C01B 2203/0244* (2013.01); *C01B 2203/043* (2013.01); *C01B 2203/0425* (2013.01); *C01B 2203/0475* (2013.01)

(56) References Cited

U.S. PATENT DOCUMENTS

| | | |
|---|---|---|
| 2011/0210292 A1 | 9/2011 | Ariyapadi |
| 2015/0191351 A1 | 7/2015 | Darde |
| 2016/0115017 A1 | 4/2016 | Ostuni et al. |

OTHER PUBLICATIONS

European Patent Office Office Action from related application 17170711.0, dated Jan. 13, 2020.

\* cited by examiner

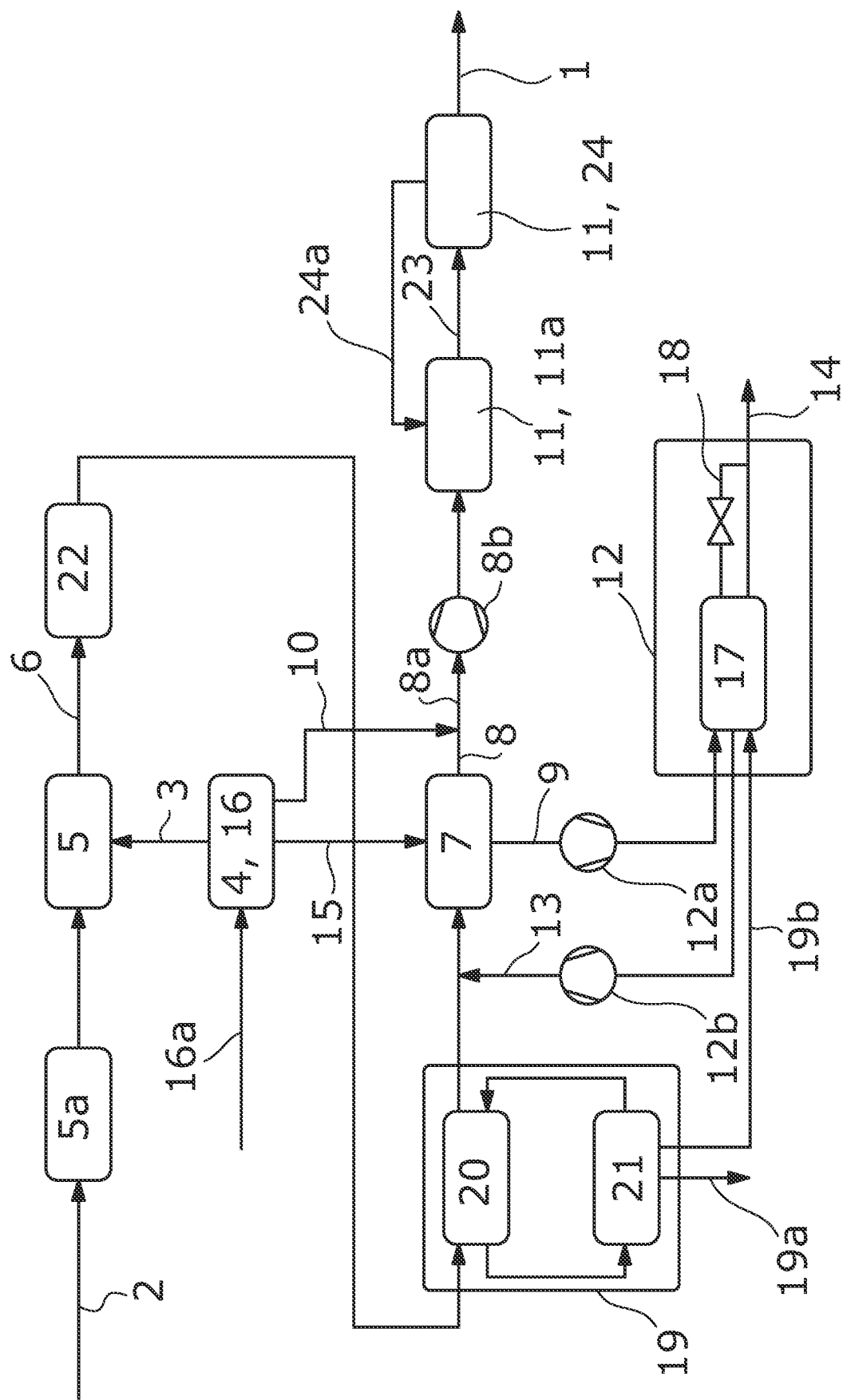

METHOD FOR PRODUCING AMMONIA

The invention relates to a method for the production of ammonia with the features of the preamble of claim 1, and to a system for the production of ammonia with the features of the preamble of claim 15.

Ammonia synthesis is based on hydrogen and nitrogen as initial materials, with the hydrogen, in particular, generally being provided by synthesis gas, which synthesis gas has been obtained, in particular, from a carbon-containing energy carrier flow, such as natural gas, by reformation.

However, obtaining hydrogen in such a way entails that the synthesis gas includes a plurality of other substances that are at first irrelevant for the ammonia synthesis or are even detrimental to the corresponding catalyst. These unwanted substances include, among others, methane but also argon and helium, with the carbon oxides even being detrimental to the catalyst. Since, during the ammonia synthesis, the gas mixture with the hydrogen and the nitrogen is generally run in a loop from which liquid ammonia is extracted by condensation, an enrichment of the other substances in the loop takes place as a matter of principle even if the carbon oxides are completely removed, which enrichment is detrimental to the ammonia synthesis and which makes it necessary to also run these unwanted substances in the loop. Particularly due to the fact that a greater dimensioning of the relevant components is required, this also results in an increase of the costs the ammonia synthesis entails.

One approach for limiting the enrichment described above, and for reducing the concentration of the above inert substances is to extract a part of the gas run in the loop. Both the reduction of a concentration of the above inert substances, such as methane, in the loop and the prevention of a loss of the extracted hydrogen and nitrogen for ammonia synthesis—which would result in a decrease in ammonia production—then require a recovery of hydrogen and/or nitrogen from the extracted gas. However, such an extraction and recovery of hydrogen and/or nitrogen generally requires a separation and re-compression of the recovered gas, with the two process steps involving a lot of technical effort, energy and thus, costs.

Thus, DE 10 2015 210 801 A1 proposes an approach which manages completely without such an extraction from the loop of the ammonia synthesis. A separation of substances such as methane, water, argon and/or carbon oxides from the gas mixture with hydrogen and nitrogen is to take place prior to this gas mixture being fed to the ammonia synthesis.

This approach is disadvantageous in that it is either possible to attain a great purity of the gas mixture, e.g. by providing a device for pressure swing adsorption (PSA) for purification, but that this results in considerable losses of hydrogen, which is as such valuable for the synthesis. Also, there are limits in the design of the PSA with regard to the supplied quantity of supplied gas and the pressure at which it is operated. If, on the other hand, a separation is used, which results in a lower purity, the issue of the inert substances is not sufficiently mitigated in order to make an extraction in the loop of the ammonia synthesis completely dispensable.

Based on this prior art, the object of the invention is therefore to provide, even in a large-scale production of ammonia, a gas suitable for ammonia synthesis, and in particular the hydrogen of that gas, in a more economical manner.

With regard to a method for the production of ammonia according to the preamble of claim 1, this object is achieved by the features of the characterizing portion of claim 1. With regard to a system for the synthesis of ammonia according to the preamble of claim 15, this object is achieved by the features of the characterizing portion of claim 15.

The invention is based on the insight that, when using an adsorption device—such as a PSA—for obtaining largely pure hydrogen from a synthesis gas flow, the loss of hydrogen can be limited by the fact that the waste gas flow from the adsorption device with the hydrogen in the waste gas flow can be fed to a recovery device, from which the hydrogen is recovered at least partly. Though this, in principle, means providing an additional device as compared with the prior-art approach, but it was found that this additional expenditure is more than compensated by the advantage of limiting hydrogen loss.

Dependent claims 2 and 3 describe preferred embodiments of the adsorption device for separating the hydrogen flow from the synthesis gas flow, wherein a pressure swing adsorption, in particular, but also a combination of pressure swing and temperature swing adsorption may be provided here.

With respect to the process, the recovery flow obtained from the recovery device can be returned to the synthesis gas flow at different locations, with dependent claim 4 describing a particularly advantageous return feed, which is upstream of the adsorption device with respect to the process.

A configuration of the pressure swing adsorption enabling a particularly large hydrogen yield, in which a particularly small quantity of hydrogen is thus extracted with the purge flow, is possible if nitrogen is used for rinsing. This is the subject matter of dependent claim 5. As is described by dependent claim 6, nitrogen that may possibly remain in the adsorption device during rinsing is not only no problem for the ammonia synthesis, but may even serve as an initial material. According to the subject matter of dependent claim 7, this nitrogen may be provided by an air separation unit.

With respect to the configuration of the recovery device, various preferred variations are described in the dependent claims 8 and 9, with dependent claim 8 describing a particularly interesting solution involving a membrane assembly, because it is particularly well suited for the recovery of the hydrogen even with a nitrogen-containing purge flow. Such a purge flow results from using nitrogen for rinsing in the adsorption device. Consequently, the particularly low-loss combination of nitrogen rinsing and hydrogen recovery is made possible in a particularly economical manner.

Dependent claims 10 to 12 describe a carbon dioxide scrubbing unit disposed upstream of the adsorption device and its further preferred configuration. The possibility of carrying out the regeneration of the absorption medium used in the carbon dioxide scrubbing unit without heating particularly offers a considerable economical advantage. This heating becomes dispensable because, due to the downstream adsorption device being provided, carbon dioxide scrubbing does not have to achieve excessive purity.

This carbon dioxide scrubbing becomes even more useful by a water gas shift being provided upstream of carbon dioxide scrubbing—as described in dependent claim 13. The high pressure of the synthesis gas, which is useful for the above-described regeneration of the used absorption medium without heating, can be ensured particularly if the synthesis gas is produced without conventional steam reforming, but by autothermic reforming. This is described in the dependent claim 14.

Other details, features, configurations, aims and advantages of the present invention are explained below with reference to the drawing, which represents only a single exemplary embodiment. In the drawing:

FIG. 1 schematically shows the flow chart of a system for carrying out an exemplary embodiment of the proposed method.

The proposed method serves for producing ammonia 1, wherein this production takes place by synthesis in a manner known per se from the prior art. In particular, the proposed method is carried out by the proposed system for producing ammonia 1 illustrated in FIG. 1.

According to the illustration of FIG. 1, the proposed system comprises an oxygen-producing assembly 4 for providing an oxygen flow 3, a synthesis gas reactor assembly 5 for obtaining a synthesis gas flow 6 including hydrogen and carbon oxides from a carbon-containing energy carrier flow 2 and the oxygen flow 3, and an adsorption device 7 for separating the synthesis gas flow 6 into a hydrogen flow 8, which comprises hydrogen, and a purge flow 9. The proposed system further comprises an ammonia reactor assembly 11 for converting the hydrogen flow 8 and a nitrogen flow 10 into ammonia 1.

The proposed system is characterized in that the system comprises a recovery device 12 for obtaining from the purge flow 9 a hydrogen-containing recovery flow 13 and a waste gas flow 14 to be discharged. According to the proposal, the hydrogen of the recovery flow 13 is at least partly fed to the ammonia reactor assembly 11 for conversion into ammonia 1.

In analogy to the proposed system, the carbon-containing energy carrier flow 2 and the oxygen flow 3 from the oxygen-producing assembly 4 are fed to the synthesis gas reactor assembly 5 in the proposed method. The carbon-containing energy carrier flow 2 may be a natural gas flow including methane, water, hydrogen sulfide, ethane, propane and, possibly, smaller fractions of butane. It may also be a flow of crude oil-associated gas or a crude oil flow. The oxygen flow 3 includes oxygen, preferably with a molar fraction of at least 80%. The oxygen flow 3 may also consist of oxygen and nitrogen, or alternatively consist substantially of oxygen. Prior to being fed to the synthesis gas reactor assembly 5, a pre-treatment of the energy carrier flow 2 may also occur, e.g. by feeding it to a desulfurization device 5a—which is also shown in FIG. 1—or to pre-reforming—which is not shown here. They are preferably also included in the system according to the proposal.

In the proposed method, the synthesis gas reactor assembly 5 is configured for obtaining a synthesis gas flow 6 with hydrogen and carbon oxides. In the process, a conversion of the hydrocarbons into hydrogen and carbon oxides—i.e. carbon monoxide and carbon dioxide—takes place in the synthesis gas reactor assembly 5 in a manner known per se from the prior art.

In the proposed method and corresponding to the illustration of FIG. 1, the synthesis gas flow 6 is further fed to the adsorption device 7 for separating the synthesis gas flow 6 into the hydrogen flow 8, which comprises hydrogen, and the purge flow 9. Prior to being fed to the adsorption device 7, the synthesis gas flow 6 may be treated in various manners, which will be described in more detail below. The purge flow 9, apart from a possibly added rinsing flow 15, which is described in more detail below, may substantially consist of the constituents of the synthesis gas flow 6 minus the hydrogen flow 8.

In the proposed method, the hydrogen flow 8 and a nitrogen flow 10 are fed to the ammonia reactor assembly 11 and converted into ammonia 1 there. It is preferred, with respect to the nitrogen flow 10, that it substantially consists of nitrogen. It is further preferred that, in accordance with the illustration of FIG. 1, the hydrogen flow 8 is merged with a nitrogen flow 10 to form a feeding flow 8a, and that this feeding flow 8a is fed to a feeding compressor 8b for compressing the feeding flow 8a, before the hydrogen flow 8 and the nitrogen flow 10 merged with it are fed to the ammonia reactor assembly 11 as the feeding flow 8a. Preferably, the proposed system includes the feeding compressor 8b.

The proposed method is characterized in that the purge flow 9 is fed to the recovery device 12, which generates a hydrogen-containing recovery flow 13 from the purge flow 9 and discharges the waste gas flow 14 therefrom, and that the hydrogen of the recovery flow 13 is at least partly fed to the ammonia reactor assembly 11 for conversion into ammonia 1. Preferably, the hydrogen of the recovery flow 13 is fed, substantially completely, to the ammonia reactor assembly 11 for conversion into ammonia 1. In the process, the recovery flow 13 from the recovery device 12 does not have to be directly fed to the ammonia reactor assembly 11 or be directly merged with the hydrogen flow 8 or the feeding flow 8a. Rather, the hydrogen of the recovery flow 13 may also be fed to the ammonia reactor assembly 11 in an indirect manner, which will be described in more detail below. Also, no elevated or exclusive fraction of hydrogen in the recovery flow 13 in relation to the synthesis gas flow 6 is required in principle, so that the recovery flow 13 may also have a molar hydrogen fraction corresponding to the synthesis gas flow 6 or even a lower molar hydrogen fraction.

It is preferred that the synthesis gas reactor assembly 5 generates the synthesis gas flow 6 from the energy carrier flow 2 by autothermic reforming with the oxygen flow 3, so that a catalytic partial oxidation provides the heat required for the endothermic reforming reactions. This is thus autothermic reforming known per se from the prior art, which is also referred to as a catalytic partial oxidation. Here, it is also preferred that the synthesis gas flow 6 exits the synthesis gas reactor assembly 5 with a discharge pressure of at least 70 bars, preferably of 75 bars to 80 bars. In the present exemplary embodiment, the synthesis gas flow 6 exits the synthesis gas reactor assembly 5 with a pressure of 72 bars and at a temperature of 1025° C. In this case, the synthesis gas flow 6 has a mass flow of 522,393 kg/h in total, and respective molar fractions of, substantially, 6% carbon dioxide, 16% carbon monoxide, 44% hydrogen, 1% methane, 32% water and less than 1% nitrogen. This high exit pressure is made possible by an original pressure of the energy carrier flow 2 of more than 78 bars and the lack of necessity of reducing the pressure for steam reforming—which is not required in this case.

Thus, higher pressures of the synthesis gas flow 6 can be attained means of this autothermic reforming, particularly in contrast to conventional steam reforming, which not only results in a lower or even completely dispensable compressor power requirement before the ammonia reactor assembly 11, but is also—as will be described below—advantageous with regard to the possibly required regeneration in the recovery device 12.

A preferred embodiment of, in each case, the proposed method and the proposed system is characterized in that the adsorption device 7 includes a plurality of containers with an absorbing agent. In this case, the containers may in each case be operated alternately in one of several phases. Thus, it is preferred that the adsorption device 7 is configured for pressure swing adsorption and, alternately, the synthesis gas flow 6 is conducted in at least one of the plurality of the containers in an adsorption phase at a higher pressure for obtaining the hydrogen flow 8 and the purge flow 9 is let out from at least one other of the plurality of the containers in a rinsing phase at a lower pressure. This is the principle of a PSA known per se from the prior art. In other words, some of the containers of the adsorption device 7 are operated, at an arbitrary point in time, in the adsorption phase in which the synthesis gas flow 6 is subjected to adsorption, whereas at the same time, other containers of the adsorption device 7 are being cleaned of the adsorbed substances in the rinsing phase. By operating the containers of the adsorption device 7 in respectively different alternating phases, both adsorption and rinsing can take place continuously, as a whole. In this case, there may also be other phases than the above-described adsorption phase and rinsing phase. It is further preferred that the adsorbing agent has a molecular sieve for separating hydrogen. Further, the higher pressure of the adsorption phase may be attained by a compression of the synthesis gas flow 6 in the adsorption device 7. In the exemplary embodiment shown in FIG. 1, the synthesis gas flow 6—including the recovery flow 13—reaches the adsorption device 7 with a pressure of substantially 65.5 bars and a temperature of 20° C. and, with a mass flow of 105,767 kg/h in total, has respective molar fractions of substantially 3% carbon dioxide, 1% carbon monoxide, 91% hydrogen, 4% methane and 1% nitrogen. It can be seen that the hydrogen fraction is very high already prior to being fed to the adsorption device 7, which results an easing of the load on the latter. The processes essential for the change of the composition of the synthesis gas flow 6 are described in more detail below. The hydrogen flow 8 from the adsorption device 7 then has a mass flow of a total of 41,175 kg/h at 43° C. and a pressure of 64.9 bars, and consists, substantially completely, of hydrogen.

Another preferred embodiment of, in each case, the proposed method and the method system is characterized in that the adsorption device 7 is configured for temperature swing adsorption and, alternately, the synthesis gas flow 6 is conducted in at least one of the plurality of the containers in an adsorption phase at a lower temperature for obtaining the hydrogen flow 8 and the purge flow 9 is let out from at least one other of the plurality of the containers in a rinsing phase at a higher temperature. This is the principle of a temperature swing adsorption (TSA), which is also known in principle from the prior art. This mode of operation in accordance with temperature swing adsorption may also be combined with the pressure swing adsorption described above. In this case, the higher temperature may be reached by an exchange of heat with a warmer fluid, and/or the lower temperature by an exchange of heat with a colder fluid.

According to a preferred embodiment of, in each case, the proposed method and the proposed system, it is provided that the recovery flow 13 is fed to the synthesis gas flow 6 upstream of the adsorption device 7 with respect to the process. This situation is also shown in FIG. 1. A part of the hydrogen in the recovery flow 13 in any case ends up in the hydrogen flow 8 and, together with that, at the ammonia reactor assembly 11. Further, this upstream feed makes it possible that no particular requirements must be made with respect to the purity of the recovery flow 13 because contaminants and inert substances are separated when passing through the adsorption device 7 again. In turn, this freedom may be crucial for the selection and economic viability of the recovery method used. However, the recovery flow 13 may be fed to the hydrogen flow 8 downstream of the adsorption device 7 with respect to the process, possibly with the nitrogen flow 10. In other words, in that case, neither the recovery flow 13 nor hydrogen from the recovery flow 13 passes through the adsorption device 7 before being fed to the ammonia reactor assembly 11.

In the present exemplary embodiment, the recovery flow 13 has a mass flow of, in total, 20,800 kg/h at a temperature of 40° C. and a pressure of 72 bars. The respective molar fractions of the recovery flow 13 substantially are 10% carbon dioxide, 3% carbon monoxide, 66% water and 4% nitrogen. In comparison, the purge flow 9 has a mass flow of, in total, 63,592 kg/h at a temperature of 40° C. and a pressure of 1.5 bars, with a respective molar fraction of substantially 19% carbon dioxide, 7% carbon monoxide, 36% hydrogen, 28% methane and 10% nitrogen. As will also be described below, the recovery device 12 may not only be supplied with the purge flow 9, but other gas flows may also be fed to it.

As was already stated, in the illustrated case of the return feed upstream of the adsorption device 7, the recovery flow 13 with the corresponding hydrogen also passes the adsorption device 7 again. The recovery flow 13 may also be, in particular, directly fed to the adsorption device 7 and recycled in this manner. This also results in the recovery flow 13 with the corresponding hydrogen passing through the adsorption device 7, but without the intermediate step of the feed to the synthesis gas flow 6.

Finally, it may also be that more than one recovery flow 13—i.e. a plurality of recovery flows—is obtained from the recovery device 12, wherein there is then, for each of these recovery flows 13 and independently of one another, one of the above-described possibilities of feeding the hydrogen of the respective recovery flow 13 at least partly to the ammonia reactor assembly 11 for conversion into ammonia 1.

A preferred embodiment of, in each case, the proposed method and the proposed system is characterized in that, for obtaining the purge flow 9, a nitrogen-containing rinsing flow 15, which preferably consists substantially of nitrogen, is fed to the adsorption device 7. Compared to a conventional rinsing flow substantially consisting of hydrogen, this is advantageous in that the losses of hydrogen due to the rinsing process are significantly reduced. In particular, the rinsing flow 15 may be fed to the at least one other of the plurality of containers in the rinsing phase in order to rinse the purge flow 9. While the greatest part of the rinsing flow 15 used leaves the adsorption device 7 with the purge flow 9, a smaller part remains in the adsorption device 7 after the rinsing process and leaves it with the hydrogen flow 8. Consequently, the hydrogen flow 8 contains a small nitrogen content which, however, does not interfere with the downstream ammonia reactor assembly 11 and even is desirable because it reduces the nitrogen flow 10 to be added.

Accordingly, it is preferred, with regard to the hydrogen flow, that it has a molar fraction of at least 90% hydrogen, and preferably of at least 95% hydrogen. It may also have a molar fraction of at least 99% hydrogen. The hydrogen flow 8 may also substantially consist of hydrogen and of nitrogen remaining in the adsorption device 7 from the rinsing flow 15. Alternatively, however, the hydrogen flow 8 may also substantially consist of hydrogen.

Given a nitrogen-containing rinsing flow 15, the purge flow 9 corresponds, with regard to its composition, to the rinsing flow 15 reduced by the amount of nitrogen remaining in the hydrogen flow 8, with the substance rinsed out of the adsorption device 7, which substance in turn corresponds to the synthesis gas flow 6 minus the hydrogen flow 8 and, if applicable, a recovery flow 13 directly fed to the adsorption device 7—as described above.

In principle, the nitrogen of this rinsing flow 15 may originate from any source. It is preferred that the rinsing flow 15 is obtained from an air separation unit 16 for obtaining nitrogen and oxygen from ambient air 16*a* and fed to the adsorption device 7. Preferably, the proposed system includes this air separation unit 16. Such an air separation unit 16 is capable of providing several substance flows for the proposed method and for the proposed system. Thus, it is also preferred that the nitrogen flow 10 is provided by the air separation unit 16. In this case, it is preferred that the rinsing flow 15 has a lower pressure than the nitrogen flow 10. It is also preferred that the oxygen-producing assembly 4 comprises the air separation unit 16 or consists of it. In this case, the oxygen flow 3 is also provided by the air separation unit 16.

Another preferred embodiment shown in FIG. 1 is characterized in that the recovery device 12 includes a membrane device 17 for separating the recovery flow 13 from the purge flow 9, so that the waste gas flow 14 remains. In other words, the separation of the recovery flow 13 by means of the membrane device 17 results in the rest of the purge flow 9 becoming the waste gas flow 14. As is also shown in FIG. 1, it is further preferred that a part of the waste gas flow 14 is used as a membrane rinsing flow 18 for rinsing the recovery flow 13. As is also shown in FIG. 1, a purge gas compressor 12*a*, which is upstream of the recovery device 12 with respect to the process and which is preferably included in the proposed system, can be used for compressing the purge gas 9, and a recovery compressor 12*b*, which is downstream of the recovery device 12 with respect to the process and which preferably also included in the proposed system, can be used for compressing the recovery flow 13.

Such a membrane device 17 is particularly suitable for being combined with rinsing flow 15 for the adsorption device 7, which substantially consists of nitrogen, because such a membrane device 17 can be operated with high nitrogen contents in the purge flow 9 without any problems.

There are also alternatives for a recovery device 12 with a membrane device 17. According to a preferred embodiment not shown herein, it is provided that the recovery device 12 has another adsorption device configured for separating the purge flow 9 into the recovery flow 13 and the waste gas flow 14. Thus, this is to some extent a sequential arrangement of adsorption devices and, in particular, PSAs. Accordingly, this further adsorption device is preferably configured for pressure swing adsorption and/or temperature swing adsorption. Compared to the adsorption device 7, a plurality of containers of the further adsorption device, in each case in the adsorption phase and in the rinsing phase, may be operated at a lower pressure than the plurality of containers of the adsorption device 7, in each case in the adsorption phase and in the rinsing phase.

According to a preferred embodiment of, in each case, the proposed method and the proposed system, it is provided that the synthesis gas flow 6 is fed to a carbon dioxide scrubbing unit 19 for washing out at least a part of the carbon dioxide from the synthesis gas flow 6. Preferably, this carbon dioxide scrubbing unit 19, which may also be referred to as a device for carbon dioxide scrubbing, is included in the proposed system. In principle, at least a part of the carbon dioxide can be washed out of the synthesis gas flow 6 in any manner in this carbon dioxide scrubbing unit 19. It is preferred, however, that the carbon dioxide is washed out in the carbon dioxide scrubbing unit 19 by a scrubbing medium comprising methanol. It is also preferred that the carbon dioxide is washed out of the synthesis gas flow 6 substantially completely by the carbon dioxide scrubbing unit 19. Preferably, the carbon dioxide scrubbing unit 19 discharges a carbon dioxide-containing flow 19*a*, which preferably substantially contains the washed-out carbon dioxide.

In this case, it is also preferred that the synthesis gas flow 6 is fed to an absorption stage 20 of the carbon dioxide scrubbing unit 19 for absorbing the carbon dioxide into the scrubbing medium, and that the scrubbing medium is run through a loop in the absorption stage 20 and in a regeneration stage 21 of the carbon dioxide scrubbing unit 19 for releasing carbon dioxide from the scrubbing medium. The mode of operation of such a scrubbing device is known per se from the prior art.

It is particularly advantageous if the scrubbing medium includes cold methanol and is guided in this manner in a so-called cold methanol loop, which is also referred to as a "cold methanol loop". Accordingly, it is preferred that a temperature of the scrubbing medium in the carbon dioxide scrubbing unit is constantly less than −10° C. Generally, even lower temperatures are being reached in this case in the regeneration stage 21, for example between −60° C. and −80° C. The temperature of the scrubbing medium in the carbon dioxide scrubbing unit may constantly be less than −20° C., or even less than −30° C. The corresponding pressure conditions of the scrubbing medium are described below.

Here, it is preferably provided that the carbon dioxide from the scrubbing medium is released in the regeneration stage 21 substantially by a pressure relief of the scrubbing medium. The carbon dioxide-containing flow 19*a* can be obtained in this manner. In particular, it is preferred that the carbon dioxide is released from the scrubbing medium in the regeneration stage 21 without heating. In this way, heating for the purpose of regeneration can be omitted, for which heating an extensive separate system component—referred to as a hot regenerator—must usually be provided. In turn, this reduces the technical effort and the energy requirements of the carbon dioxide scrubbing unit 19, which is characteristic for the approach of the cold methanol loop. After the carbon dioxide has been released without heating from the scrubbing medium, the carbon dioxide may actually be heated compared therewith, e.g. to a temperature range of between 0° C. and 20° C., by means of a heat exchange with hot synthesis gas to be cooled.

For using such a regeneration virtually only by pressure relief, low requirements with respect to the residual content to be attained—molar fraction—of carbon dioxide in the synthesis gas flow 6 fed to the adsorption device 7 are advantageous, which molar fraction is in the range of between 0.2% and 3%, preferably between 1% and 2%. According to FIG. 1, an adsorption device 7 for pressure swing adsorption and thus for removing carbon oxides, methane and other inert substances is the present case downstream of the carbon dioxide scrubbing unit 19, so that the residual carbon dioxide remaining after the carbon dioxide scrubbing 19 in the synthesis gas flow 6 is effectively removed there.

Such a regeneration substantially by means of pressure relief is easily possible particularly if the synthesis gas flow 6 is passed through the carbon dioxide scrubbing unit 19 with as high a pressure as possible. As was already described above, providing autothermic reforming in the synthesis gas reactor assembly 5 permits providing the synthesis gas flow 6 with an exit pressure of at least 70 bars.

Further, it is preferred in this context that the scrubbing medium is pumped to a higher pressure in the loop feed from the regeneration stage 21 to the absorption stage 20. This corresponds to the reverse process to the above-described pressure relief.

The drastic cooling of the scrubbing medium taking place in the pressure relief process is a desired and characteristic effect of the cold methanol loop. It results in the regenerated and returned scrubbing medium being capable of absorbing the carbon dioxide extremely efficiently again, so that the carbon dioxide scrubbing unit can be designed to by very compact as a whole, and the required amount of scrubbing medium can be very small.

In the present exemplary embodiment of FIG. 1, the synthesis gas flow 6 fed to the carbon dioxide scrubbing unit 19 and particularly the absorption stage 20, at a mass flow of 407,780 kg/h and a temperature of 40° C. and a pressure of 67.5 bars, has a respective molar fraction of, substantially, 26% carbon dioxide, 1% carbon monoxide, 70% hydrogen, 2% methane and 1% nitrogen. Accordingly, it is preferred that the synthesis gas flow 6 is fed to the carbon dioxide scrubbing unit 19 with a pressure of, in each case, at least 30 bars, of at least 40 bars, of at least 50 bars, of at least 60 bars or of at least 65 bars. In this case, the pressure of the scrubbing medium in the absorption stage 20 substantially corresponds to the above-described pressure of the synthesis gas flow 6 in the carbon dioxide scrubbing unit 19. In the regeneration stage 21, the pressure of the scrubbing medium may drop down to substantially atmospheric pressure, or even to a vacuum.

It is preferred that, conforming to the exemplary embodiment shown in FIG. 1, the release of the carbon dioxide in the regeneration stage 21 takes place in several stages, so that the carbon dioxide scrubbing unit 19—and particularly the regeneration stage 21—releases a carbon dioxide-containing flow 19a and a hydrogen-containing flow 19b, wherein, preferably, the hydrogen-containing flow 19b substantially contains washed-out hydrogen. This situation can also be expressed such that a molar carbon dioxide fraction of the carbon dioxide-containing flow 19a is greater than that of the hydrogen-containing flow 19b. It can also be found that a molar hydrogen fraction of the hydrogen-containing flow 19b is greater than that of the carbon dioxide-containing flow 19a.

When carbon dioxide is washed out, other constituents of the scrubbed gas flow, for example also hydrogen, are generally washed out as well. However, the various washed-out gases are released in the above pressure relief of the scrubbing medium primarily at different pressure relief stages. Consequently, as in the exemplary embodiment according to FIG. 1, the carbon dioxide scrubbing unit 19 can discharge the hydrogen-containing flow 19b by means of a first pressure relief of the scrubbing medium in the regeneration stage 21, and the carbon dioxide-containing flow 19a by means of a second pressure relief of the scrubbing medium in the regeneration stage 21. According to the present exemplary embodiment, the carbon dioxide-containing flow 19a has a mass flow of 305,372 kg/h at a temperature of 40° C. and a pressure of 1.5 bars as well as a molar fraction of 99% carbon dioxide. In contrast, the hydrogen-containing flow 19b, which is fed to the above-described recovery device 12, has a mass flow of 14,654 kg/h at a temperature of 45° c. and a pressure of 7 bars. The hydrogen-containing flow 19b further has a molar fraction of substantially 60% carbon dioxide, 1% carbon monoxide, 31% hydrogen, 6% methane and 2% argon. It can thus be seen that the content of hydrogen is not inconsiderable, which can then be used by feeding it to the recovery device 12.

A preferred embodiment of, in each case, the proposed method and the proposed system is characterized in that the synthesis gas flow 6 is fed to a shift device 22, that the synthesis gas flow 6 fed to the shift device 22 includes water, and that a water-gas shift reaction for converting at least a part of the carbon monoxide of the synthesis gas flow 6 with the water into carbon dioxide and hydrogen takes place in the shift device 22. Preferably, the shift device 22 is included in the proposed system. Preferably, this feed to the shift device 22 is upstream of the carbon dioxide scrubbing unit 19 with respect to the process, which is also shown to be the case in FIG. 1. On the one hand, the water in the synthesis gas flow 6 may already be present in the energy carrier flow 2. On the other hand, it may also be fed to the synthesis gas flow 6 in a saturation—which is not shown here. Of the energy carrier flow 2, only hydrogen—in addition to the nitrogen that may be present—is of relevance for ammonia synthesis, so that, advantageously, the carbon oxides in the synthesis gas flow 6 can be removed therefrom as much as possible already prior to the feed to the adsorption device 7. On the one hand, valuable hydrogen is additionally obtained and, on the other hand, carbon dioxide is obtained at the expense of carbon monoxide, by the water-gas shift reaction carried out in the shift device 22. Thus, because of the combination with the above carbon dioxide scrubbing unit 19, the composition of the carbon oxides in the synthesis gas flow 6 is first shifted in the shift device 22 in favor of the carbon dioxide over the carbon monoxide—while obtaining hydrogen—and then, the carbon dioxide is washed out substantially completely. As a result, the synthesis gas flow 6 fed to the adsorption device 7 has only a small carbon oxide content, so that the load on the adsorption device 7 becomes small. In addition to the shift device 22 and the carbon dioxide scrubbing unit 19 shown in FIG. 1, the synthesis gas flow 6 may pass further process stages, which are not separately shown or described here, between the synthesis gas reactor assembly 5 and the adsorption device 7, particularly stages for changing the temperature or the water or water vapor content.

In the exemplary embodiment of FIG. 1, the synthesis gas flow 6 fed to the shift device 22 has a mass flow of 522,393 kg/h at a temperature of 320° Celsius and a pressure of 71.5 bars. The synthesis gas flow 6 has a molar fraction of, substantially, 6% carbon dioxide, 16% carbon monoxide, 44% hydrogen, 1% methane, 1% nitrogen and 32% water. The synthesis gas flow 6 obtained from the shift device 22—which was thus already subjected to the above water-gas shift reaction—then has a mass flow of 522,397 kg/h at a temperature of 355° C. and a pressure of 69 bars. With respect to its composition, it now has a molar fraction of, substantially, 21% carbon dioxide, 1% carbon monoxide, 58% hydrogen, 2% methane, 1% nitrogen and 18% water. Thus, the hydrogen content has recognizably risen by 14 percentage points, and thus by more than 25% percent, whereas the carbon oxides in the synthesis gas flow 6 now almost exclusively consist of carbon dioxide.

According to the illustration in FIG. 1, it may be, according to a preferred embodiment of, in each case, the proposed method and the proposed system, that the ammonia reactor assembly 11 has a reactor stage 11a for the ammonia synthesis and a condensation stage 24 for separating ammonia 1 from residual gas 24a, which is downstream of the reactor stage 11a with respect to the process. In that case, the ammonia 1 synthesized in the reactor stage 11 is first conveyed out of the reactor stage 11a as a raw ammonia flow 23 and fed to the condensation stage 24, from which the ammonia 1 is obtained by condensation. According to the illustration in FIG. 1, a remaining residual gas 24a is recycled from the condensation stage 24 to the reactor stage 11a. In this case, it is further preferred that a cooling of the condensation stage 24 is coupled in a manner not shown in FIG. 1 with the carbon dioxide scrubbing unit 19 for cooling the scrubbing medium.

The above-described preferred embodiments of the proposed method correspond to preferred embodiments of the proposed system, and vice versa.

We claim:

1. A method for producing ammonia, wherein a carbon-containing energy carrier flow and an oxygen flow from an oxygen-producing assembly are fed to a synthesis gas reactor assembly for obtaining a synthesis gas flow with hydrogen and carbon oxides, wherein the synthesis gas flow is fed to an adsorption device for separating the synthesis gas flow into a hydrogen flow, which comprises hydrogen, and a purge flow, and wherein the hydrogen flow and a nitrogen flow are fed to an ammonia reactor assembly and converted into ammonia there, wherein the purge flow is fed to a recovery device, which obtains a hydrogen-containing recovery flow from the purge flow and discharges a waste gas flow therefrom, and that the hydrogen of the recovery flow is at least partly fed to the ammonia reactor assembly for conversion into ammonia, wherein the waste gas flow comprises nitrogen the recovery device includes a membrane device for separating the recovery flow from the purge flow, so that the waste gas flow remains and that a part of the waste gas flow is used as a membrane rinsing flow for rinsing the recovery flow.

2. The method according to claim 1, wherein the adsorption device includes a plurality of containers with an absorbing agent and the adsorption device is configured for pressure swing adsorption and, alternately, the synthesis gas flow is conducted in at least one of the plurality of the containers in an adsorption phase at higher pressure for producing the hydrogen flow and the purge flow is let out from at least one other from the plurality of the containers in a rinsing phase at lower pressure, and wherein the adsorbing agent has a molecular sieve for separating hydrogen.

3. The method according to claim 2, wherein the adsorption device is configured for temperature swing adsorption and, alternately, the synthesis gas flow is conducted in at least one of the plurality of the containers in an adsorption phase at a lower temperature for obtaining the hydrogen flow and the purge flow is let out from at least one other of the plurality of the containers in a rinsing phase at a higher temperature.

4. The method according to claim 1, wherein the recovery flow is fed to the synthesis gas flow upstream of the adsorption device with respect to the process.

5. The method according to claim 1, wherein, for obtaining the purge flow, a nitrogen-containing rinsing flow, which consists substantially of nitrogen, is fed to the adsorption device.

6. The method according to claim 1, wherein the hydrogen flow has a molar fraction of at least 90% hydrogen.

7. The method according to claim 5, wherein the rinsing flow is obtained from an air separation unit for obtaining nitrogen and oxygen from ambient air and fed to the adsorption device, that the nitrogen flow is provided by the air separation unit.

8. The method according to claim 1, wherein the recovery device comprises a further adsorption device configured for separating the purge flow into the recovery flow and the waste gas flow, wherein the further adsorption device is configured for pressure swing adsorption and/or temperature swing adsorption.

9. The method according to claim 1, wherein the synthesis gas flow is fed to a carbon dioxide scrubbing unit for washing out at least a part of the carbon dioxide from the synthesis gas flow, wherein the carbon dioxide is washed out in the carbon dioxide scrubbing unit by a scrubbing medium comprising methanol.

10. The method according to claim 9, wherein the synthesis gas flow is fed to an absorption stage of the carbon dioxide scrubbing unit for absorbing the carbon dioxide into the scrubbing medium, and that the scrubbing medium is run through a loop in the absorption stage and in a regeneration stage of the carbon dioxide scrubbing unit for releasing carbon dioxide from the scrubbing medium.

11. The method according to claim 10, wherein the carbon dioxide from the scrubbing medium is released in the regeneration stage substantially by a pressure relief of the scrubbing medium, wherein the carbon dioxide is released from the scrubbing medium in the regeneration stage without heating.

12. The method according to claim 1, wherein the synthesis gas flow is fed upstream of the carbon dioxide scrubbing unit with respect to the process, to a shift device, that the synthesis gas flow fed to the shift device includes water, and that a water-gas shift reaction for converting at least a part of the carbon monoxide of the synthesis gas flow with the water into carbon dioxide and hydrogen takes place in the shift device.

13. The method according to claim 1, wherein the synthesis gas reactor assembly obtains the synthesis gas flow from the energy carrier flow by autothermic reforming with the oxygen flow, so that a catalytic partial oxidation provides the heat required for the endothermic reforming reactions, wherein the synthesis gas flow exits the synthesis gas reactor assembly with a discharge pressure of at least 70 bars.

* * * * *